(12) United States Patent
Fukui et al.

(10) Patent No.: US 12,537,929 B2
(45) Date of Patent: Jan. 27, 2026

(54) DISPLAY DEVICE AND DISPLAY METHOD

(71) Applicant: Panasonic Intellectual Property Management Co., Ltd., Osaka (JP)

(72) Inventors: Atsushi Fukui, Osaka (JP); Yosuke Araki, Osaka (JP); Wahei Agemizu, Osaka (JP); Takashi Matsuda, Hyogo (JP); Kazumasa Takata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/884,087

(22) Filed: Sep. 12, 2024

(65) Prior Publication Data
US 2025/0008075 A1   Jan. 2, 2025

Related U.S. Application Data

(63) Continuation of application No. PCT/JP2023/001082, filed on Jan. 17, 2023.

(30) Foreign Application Priority Data

Mar. 25, 2022  (JP) .................................. 2022-049761

(51) Int. Cl.
*H04N 13/322* (2018.01)
*H04N 13/398* (2018.01)

(52) U.S. Cl.
CPC ......... *H04N 13/322* (2018.05); *H04N 13/398* (2018.05)

(58) Field of Classification Search
CPC ... H04N 13/322; H04N 13/344; H04N 13/398
See application file for complete search history.

(56) References Cited

U.S. PATENT DOCUMENTS

| | | | |
|---|---|---|---|
| 5,355,181 A | 10/1994 | Ashizaki et al. | |
| 11,650,437 B1* | 5/2023 | Lin ...................... | G02F 1/1396 349/13 |
| 2002/0047837 A1* | 4/2002 | Suyama ............... | H04N 13/398 348/E13.032 |

(Continued)

FOREIGN PATENT DOCUMENTS

| | | |
|---|---|---|
| JP | 64-042998 | 2/1989 |
| JP | 04-285993 | 10/1992 |

(Continued)

OTHER PUBLICATIONS

International Search Report of PCT application No. PCT/JP2023/001082 dated Mar. 7, 2023.

*Primary Examiner* — Md N Haque
(74) *Attorney, Agent, or Firm* — Wenderoth, Lind & Ponack, L.L.P.

(57) ABSTRACT

A display device according to a present exemplary embodiment includes: a varifocal lens having a variable focal length; a display disposed facing the varifocal lens; and a controller configured to control the focal length of the varifocal lens, and to cause the display to display an image. The controller is configured to shorten the focal length of the varifocal lens when a distant image is to be displayed on display, and to extend the focal length f of varifocal lens when a nearby image is to be displayed on the display.

8 Claims, 9 Drawing Sheets

(56) References Cited

U.S. PATENT DOCUMENTS

| | | |
|---|---|---|
| 2010/0289970 A1 | 11/2010 | Watanabe |
| 2019/0139472 A1* | 5/2019 | Liu .................. G02B 26/004 |
| 2020/0218084 A1* | 7/2020 | Zhu .................. G02B 26/005 |
| 2021/0141231 A1* | 5/2021 | Yeh .................. G02B 27/017 |
| 2022/0019138 A1* | 1/2022 | Jo .................... H04N 9/317 |

FOREIGN PATENT DOCUMENTS

| | | |
|---|---|---|
| JP | 09-243960 | 9/1997 |
| JP | 09-297282 | 11/1997 |
| JP | 2001-148871 | 5/2001 |
| JP | 2001-238229 | 8/2001 |
| JP | 2002-196280 | 7/2002 |
| JP | 2009-180758 | 8/2009 |
| JP | 2018-042755 | 3/2018 |

\* cited by examiner

DISPLAY DEVICE AND DISPLAY METHOD

TECHNICAL FIELD

The present disclosure relates to a display device and a display method capable of providing a user with stereoscopic view of objects in a virtual space.

BACKGROUND ART

Humans can get the sense of three-dimensionality of objects and the sense of depth with the presence of a convergence angle (an angle formed by directions of lines of sight of the two eyes with respect to an object) and binocular parallax (a difference in images perceived by the right eye and the left eye). By taking advantage of the convergence angle and binocular parallax, it is possible to provide a user with a stereoscopic view of the objects displayed on a two-dimensional display.

For example, according PTL 1, a virtual image with a stereoscopic effect and the sense of depth can be presented by displaying images giving a convergence angle and binocular parallax to the user, on displays corresponding to the left eye and the right eye, respectively.

CITATION LIST

Patent Literature

PTL 1: Unexamined Japanese Patent Publication No. 2001-148871

SUMMARY OF THE INVENTION

However, in the configuration according to PTL 1, the distance between both eyes and the virtual image always remains constant. For this reason, the distance to an object from the eyes, the distance being given by a convergence angle and binocular parallax, does not match the distance of the virtual image from the eyes; therefore, the user may experience some awkwardness in their vision.

In addition, to prevent accumulation of eye fatigue, people usually move their eye muscles unconsciously by looking near and far alternately. However, eyes do not make any adjustment of the focal length in a virtual space, regardless of whether one looks near or far. Therefore, if a person keeps looking in the virtual space for a long time, the eyes can get tired easily.

Therefore, an object of the present disclosure is to provide a display device and a display method for alleviating the awkwardness in vision and eye fatigue, in a display device and a display method capable of providing a user with stereoscopic view of objects in a virtual space.

In order to achieve the object described above, a display device according to an exemplary embodiment of the present disclosure includes: a varifocal lens having a variable focal length; a display disposed facing the varifocal lens; and a controller configured to cause the display to display an image, while controlling a focal length of the varifocal lens. The controller extends the focal length of the varifocal lens when a distant image is to be displayed in the image, and shortens the focal length of the varifocal lens when a nearby image is to be displayed in the image.

According to the present disclosure, it is possible to reduce awkwardness in the vision and eye fatigue, in a display device capable of presenting a user with stereoscopic view of objects in a virtual space.

DESCRIPTION OF EMBODIMENT

Exemplary embodiments of the present invention will now be described in detail with reference to the drawings. The following description of preferred exemplary embodiments is merely exemplary in nature and is not intended to limit the present invention, its application, or its usage in any way. In the following description, the same parts are denoted by the same reference signs, and detailed description thereof will be omitted as appropriate.

First Exemplary Embodiment

Figure 1:
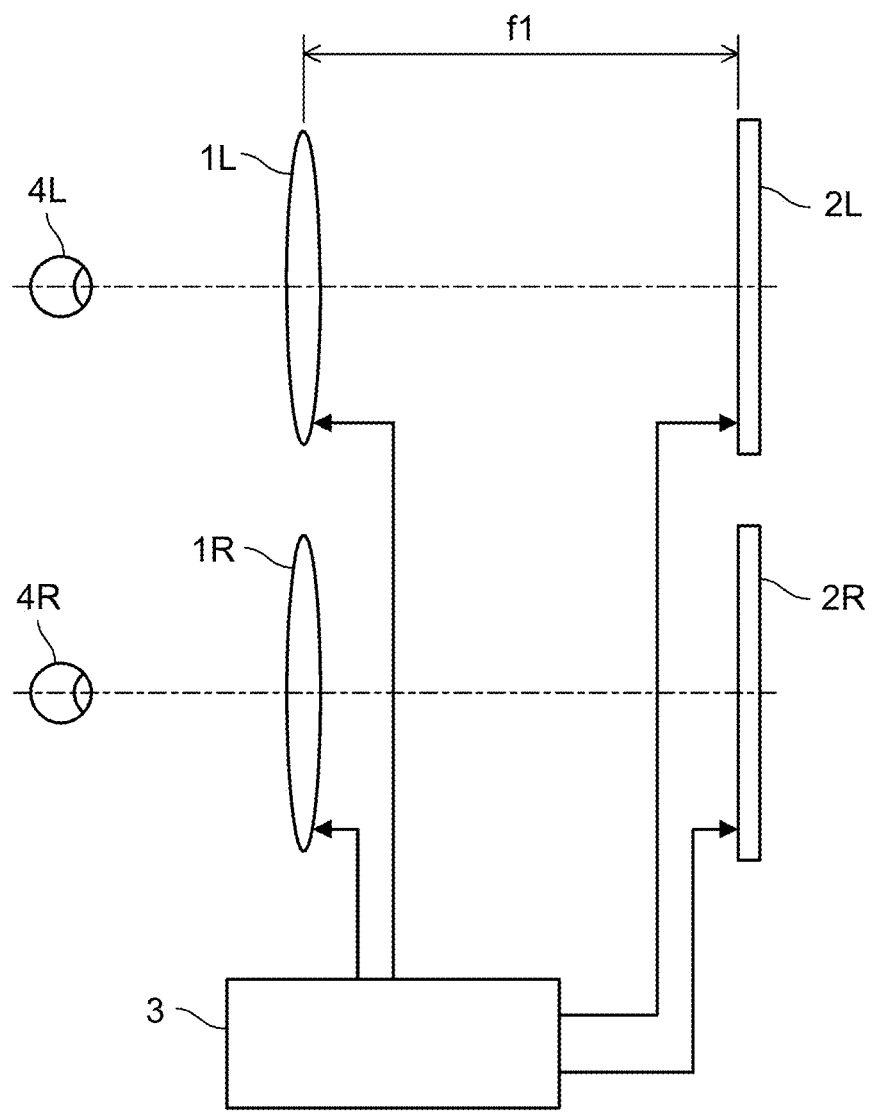
FIG. 1 is a schematic diagram of a display device according to a first exemplary embodiment.

FIG. 1 is a schematic diagram of a display device according to a first exemplary embodiment.

As illustrated in FIG. 1, the display device according to the first exemplary embodiment includes varifocal lenses 1L, 1R, displays 2L, 2R, and controller 3. As illustrated in FIG. 1, varifocal lens 1L (1R) and display 2L (2R) are disposed along the direction of line of sight of user's left eye 4L (right eye 4R).

Varifocal lens 1L (1R) is a varifocal lens capable of changing focal length f continuously. Varifocal lens 1L (IR) changes focal length f by changing the shape of the surface by injecting and discharging a liquid into and from an element in which the liquid is sealed, such as a piezoelectric element or an electromagnetic coil, by physically changing the shape of the element. Because varifocal lens 1L (1R) changes focal length f by changing its physical shape, when a smaller lens diameter is used, higher responsiveness can be achieved. In the following description, the maximum focal length of varifocal lens 1L (1R) is denoted as f1.

Varifocal lens 1L (1R) is positioned in front of right eye 4R (left eye 4L) of a user who uses the display device.

Display 2L (2R) is a two-dimensional display configured to display images. Display 2L (2R) includes a plurality of pixels, for example, and each of the pixels is configured as an arrangement of extremely small LED elements each consisting of a set of R, G, and B, which are the three primary colors of light. As will be described later in detail, because display 2L (2R) switches the images being displayed in short time periods, it is necessary to refresh the images more quickly than the conventional two-dimensional display. As a two-dimensional display for display 2L (2R), a liquid crystal display is used, for example. Because the response time of a liquid crystal display is several milliseconds, liquid crystal displays can refresh images at about 30 Hz, but an afterimage tends to appear as the response time becomes shorter. In order to display images with the sense of depth, display 2L (2R) needs to refresh the images in the depth direction (about 30 Hz). Therefore, display 2L (2R) is required to refresh images at about 900 Hz, and therefore, liquid crystal displays are not quite capable of satisfying such requirement. Therefore, it is preferable for display 2L (2R) to have a pixel structure including LED elements, with each LED element being capable of responding with response time of several microseconds or less, and of refreshing images at 1 KHz or higher.

Display 2L (2R) is disposed at a distance of maximum focal length f1, from varifocal lens 1L (1R), as illustrated in FIG. 1. That is, display (2L) is disposed in a manner facing varifocal lens 1L (1R).

If display 2L (2R) is positioned farther away from varifocal lens 1L (1R) than maximum focal length f1, a user will not be able to focus on display 2L (2R) even by setting focal length f of varifocal lens 1L (1R) to maximum focal length f1; therefore, a distant image displayed on display 2L (2R) will appear blurry. If display 2L (2R) is positioned closer to varifocal lens 1L (1R) that focal length f of varifocal lens 1L (1R), a distant image displayed on display 2L (2R) will not become blurred, but it will not be possible to make an effective use of the adjustable range of focal length f of varifocal lens 1L (1R). In other words, the resolution of the display device becomes lower, and the image quality of depth images deteriorates. Meanwhile, the focal lengths of optical elements such as a lens generally include manufacturing errors of 1% to 2%; therefore, if display 2L (2R) is disposed at a distance of maximum focal length f1 of varifocal lens 1L (1R), display 2L (2R) may be outside the adjustable range of focal length f of varifocal lens 1L (1R), due to the effect of the manufacturing error of the optical element. Therefore, considering the manufacturing error and an assembly error of the lens, it is preferable for display 2L (2R) to be positioned at a distance of f1×(0.9±0.1), considering an error of 10% with respect to maximum focal length f1 of the varifocal lens. In such a case, the adjustment resolution of varifocal lens 1L (1R) deteriorates by 10%. Note that, when there is a larger error, display 2L (2R) may be positioned at a distance of f1×(0.8±0.2) considering an error of 20%, but the adjustment resolution of varifocal lens 1L (1R) will deteriorate further.

If some degree of blurriness of the image displayed on display 2L (2R) is acceptable, display 2L (2R) may be positioned farther away from varifocal lens f1. For example, if an error of 5% is acceptable, display 2L (2R) may be positioned within a range of f1×0.8 to f1×1.05. From the above, display 2L (2R) may be positioned within the range of ±5% to −20% with respect to the maximum focal length f of varifocal lens 1L (1R) from varifocal lens 1L (1R).

Controller 3 controls varifocal lenses 1L, 1R and displays 2L, 2R. Specifically, controller 3 controls the focal lengths of varifocal lenses 1L, 1R.

Figure 2:
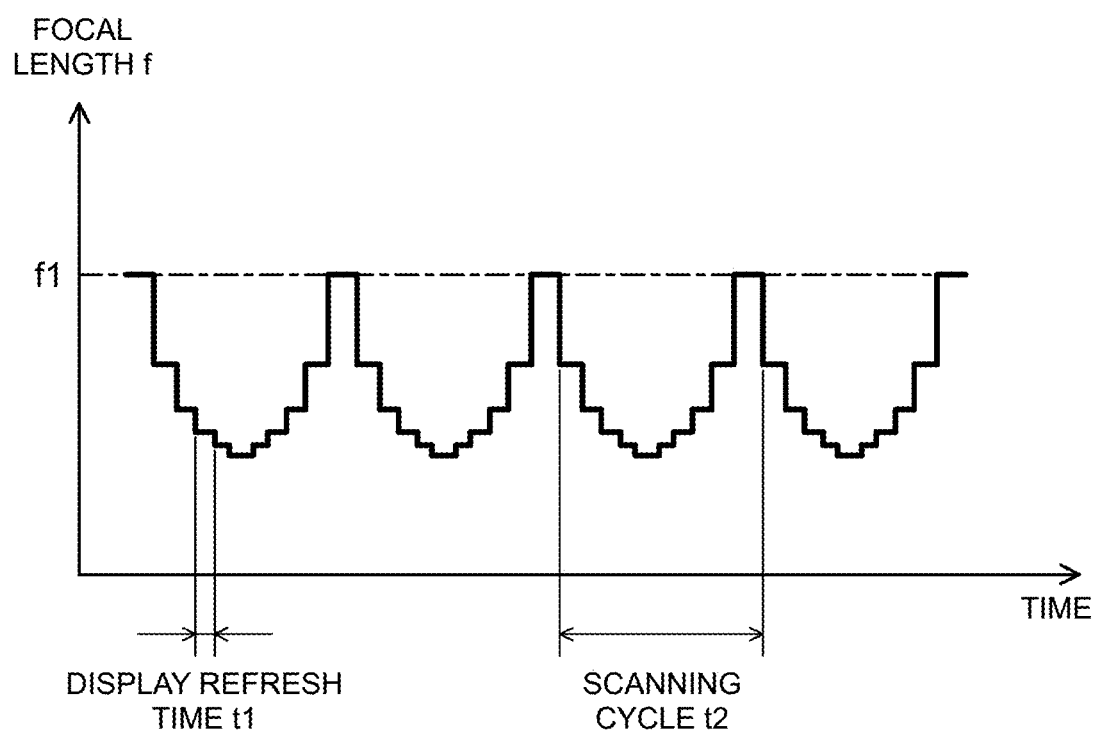
FIG. 2 is a graph illustrating a change in the focal length of a varifocal lens according to the first exemplary embodiment.

FIG. 2 is a graph illustrating a change in the focal length of the varifocal lens according to the first exemplary embodiment. In FIG. 2, the vertical axis represents focal length f of varifocal lens 1L (1R), and the horizontal axis represents time. Controller 3 controls focal length f of varifocal lens 1L (1R) in accordance with the graph illustrated in FIG. 2.

Specifically, controller 3 gradually shortens focal length f of varifocal lens 1L (1R) from maximum focal length f1 to a predetermined focal length (which may be set to any length). Controller 3 then gradually extends focal length f of varifocal lens 1L (1R) from the predetermined focal length to maximum focal length f1. Controller 3 performs this control of focal length f, at each scanning cycle t2. Note that controller 3 changes focal length f of varifocal lens 1L (IR) once in every image refresh time t1 that is an interval at which the image on display 2L is refreshed (2R).

Controller 3 also outputs an image group including a plurality of images to display 2L (2R), and causes display 2L (2R) to display a stereoscopic image. The image group is stored in controller 3, and controller 3 refreshes the image displayed on display 2L (2R) at each image refresh time t1 by sequentially outputting the images included in the image group to display 2L (2R) in the increments of image refresh time t1. As will be described in detail later, controller 3 reads the image group from an external storage (not illustrated) storing therein the image group, and stores the image group in controller 3.

In order to reduce flickering of the image being displayed on display 2L (2R), scanning cycle t2 is set to at least 30 Hz or higher. In other words, all of the images included in the image group are displayed on display 2L (2R) within 1/30 seconds or less. For example, when the number of images included in the image group is thirty, image refresh time t1 will be 1/900 seconds or less.

Figure 3:
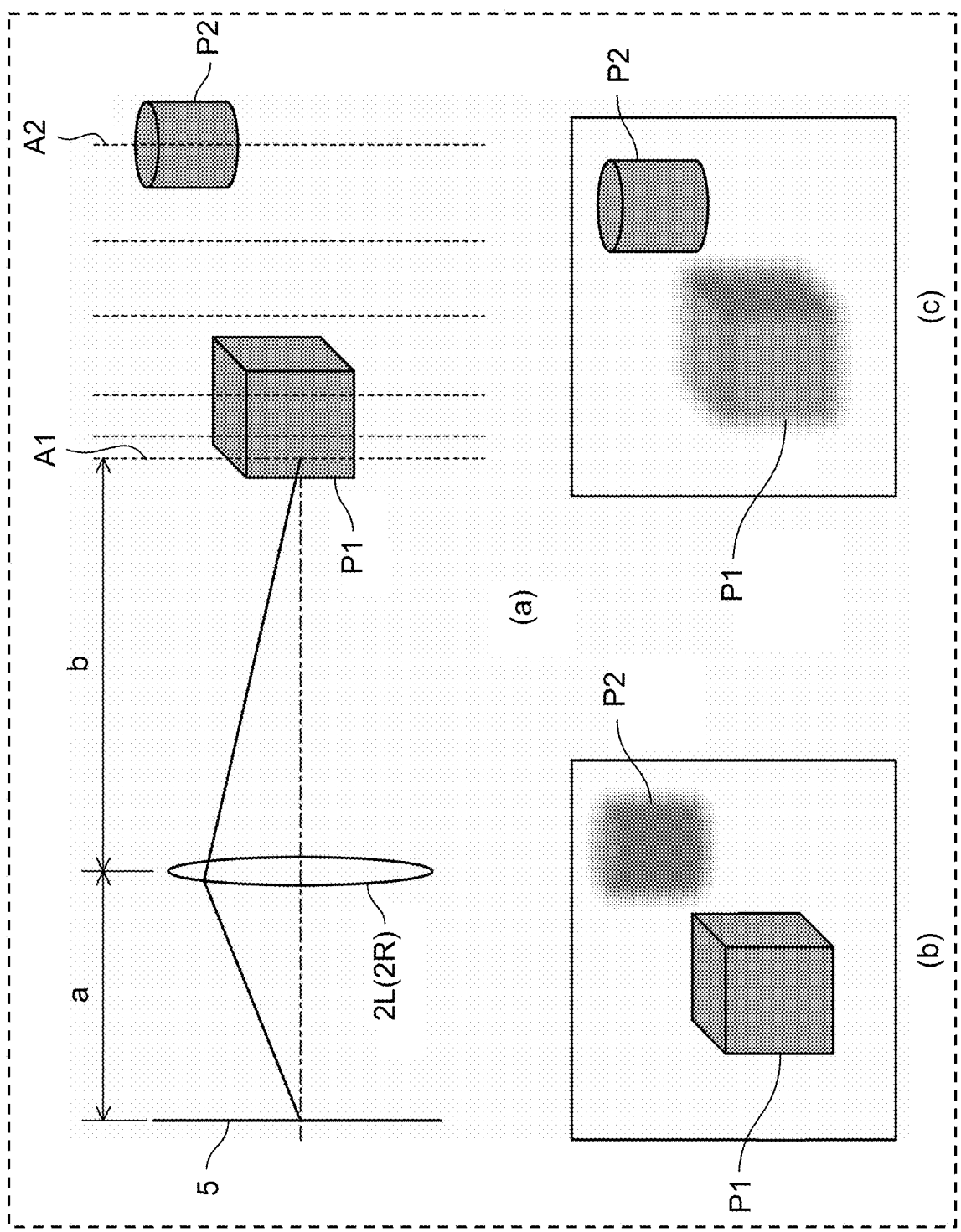
FIG. 3 is a diagram for explaining a method for generating an image group to be stored in a controller according to the first exemplary embodiment.

FIG. 3 is a diagram for explaining a method for generating the image group to be stored in the controller according to the first exemplary embodiment. As an example, it is assumed herein that object P1 is to be recognized by a user as being near to the user, and object P2 is to be recognized by the user as being far from the user, in the virtual space. In such a case, varifocal lens 1L (1R), objects P1, P2, and imaging surface 5 of a camera by which the images are generated, are positioned as illustrated in part (a) of FIG. 3. Denoting the distance from imaging surface 5 to varifocal lens 1L (1R) as a, and denoting the distance from varifocal lens 1L (1R) to object P1 as b, focal length f of varifocal lens 1L (1R) is expressed as $1/f = 1/a + 1/b$.

Part (b) of FIG. 3 illustrates an image captured by the camera (imaging surface 5) when focal length f of varifocal lens 1L (1R) is set to distance A1; and part (c) of FIG. 3 illustrates an image captured by the camera (imaging surface 5) when focal length f of varifocal lens 1L (1R) is set to distance A2. As illustrated in part (b) of FIG. 3, when focal length f of varifocal lens 1L (1R) is set to distance A1 that is near imaging surface 5, because the focus is on object P1 positioned nearer to imaging surface 5, the contour of object P1 will be clear but the contour of object P2 at a position farther away from imaging surface 5 will be unclear. By contrast, as illustrated in part (c) in FIG. 3, when focal length f of varifocal lens 1L (1R) is set to distance A2 that is far from imaging surface 5, because the focus is on object P2 positioned farther away from imaging surface 5, the contour of object P2 will be clear but the contour of object P1 that is disposed nearer will be unclear.

In the present exemplary embodiment, a plurality of images are generated by causing the camera (imaging surface 5) to capture images including objects P1, P2 while changing focal length f of varifocal lens 1L (1R). The plurality of images thus generated are stored in an external storage (and in controller 3), as the image group. At this time, as focal length f of varifocal lens 1L (1R) is shortened, images are captured at shorter intervals; and as focal length f of varifocal lens 1L (1R) is extended, images are captured at longer intervals. In other words, when focal length f is set near imaging surface 5, images are generated (captured) at shorter intervals, and when focal length f is set farther away from imaging surface 5, images are generated (captured) at longer intervals.

Figure 4:
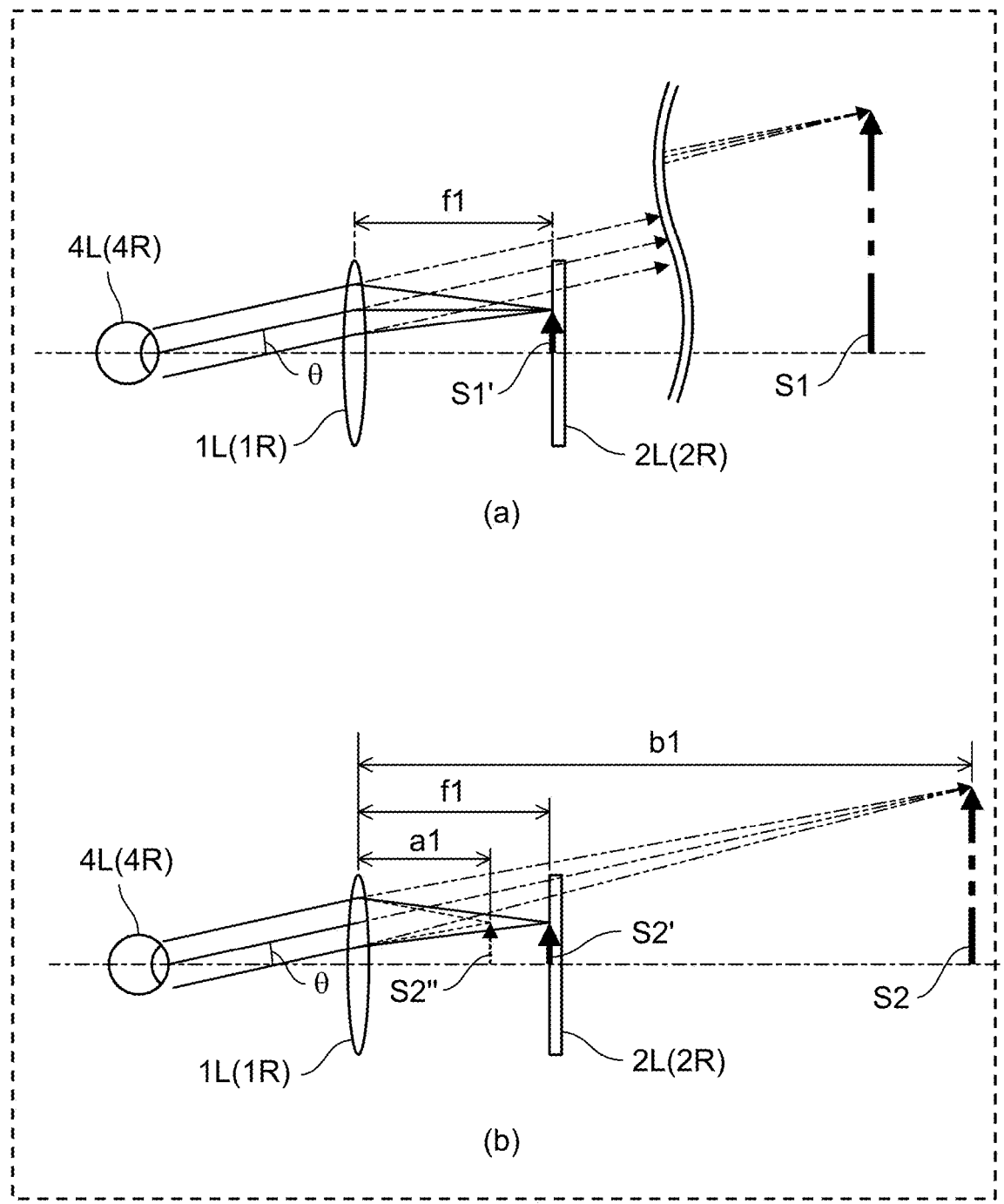
FIG. 4 is a diagram for explaining an operation principle of the display device according to the first exemplary embodiment.

FIG. 4 is a diagram for explaining an operation principle of the display device according to the first exemplary embodiment. Specifically, part (a) of FIG. 4 illustrates a user looking far, and part (b) FIG. 4 illustrates the user looking near. Note that θ indicates a parallax direction of user's left eye 4L (right eye 4R).

As illustrated in part (a) in FIG. 4, when the user looks at image S1 disposed far away, substantially parallel rays of light become incident on the eye. At this time, the crystalline lens in user's left eye 4L (right eye 4R) is adjusted and becomes thinner by being pulled by muscles so that the focal length is extended to form the image on the retina.

When controller 3 sets focal length f of varifocal lens 1L (1R) to maximum focal length f1, because display 2L (2R) is disposed at maximum focal length f1 of varifocal lens 1L (1R), left eye 4L (right eye 4R) will focus on an image displayed on display 2L (2R) (specifically, on image S1'). At this time, varifocal lens 1L (IR) collimates the light emitted from each pixel of display 2L (2R) into parallel rays. As a result, light rays similar to that when the user looks at image S1 disposed far become incident on left eye 4L (right cyc 4R). In part (a) of FIG. 4, image S1' displayed at f1×sin (θ) on display 2L (2R) corresponds to image S1 disposed at parallax direction θ.

As illustrated in part (b) of FIG. 4, when the user looks at image S2 disposed nearby, divergent rays of light become incident on the eyes. At this time, the crystalline lens in user's left eye 4L (right eye 4R) is adjusted and becomes thicker by the muscles, so that the focal length is shortened to form the image on the retina.

Denoting the distance from varifocal lens 1L (1R) to image S2 as b1, and denoting the position where image S2 perceived through varifocal lens 1L (IR) is formed as a1, focal length f of varifocal lens 1L (1R) is expressed as $1/f=1/a1-1/b1$. By transforming this equation, $1/a1=1/f+1/b1$ is obtained. Therefore, with focal length f of varifocal lens 1L (1R) kept at maximum focal length f1, the focus of the eye will be at a position offset from display 2L (2R) in the direction toward varifocal lens 1L (1R) (specifically, the position of image S2"). For this reason, with the conventional display device (such as that disclosed in PTL 1), left eye 4L (right eye 4R) needs to make the adjustment of the crystalline lens so that the focal length of the crystalline lens is adjusted to the image being displayed on display 2L (2R) (the image 2S' in part (b) of FIG. 4). This adjustment has caused the eye fatigue and awkwardness in the vision.

By contrast, in the present exemplary embodiment, controller 3 sets focal length f of varifocal lens 1L (1R) to focal length f'. Focal length f' is expressed as $1/f'=1/f-1/b1$. As a result, when the user looks through varifocal lens 1L (1R), because the focus is at the position of display 2L (2R) (specifically, the position of the image S2'), left eye 4L (right eye 4R) do not need to adjust the focal length of the crystalline lens, and therefore, the eye fatigue and the awkwardness in the vision are alleviated. In part (b) of FIG. 4, image S2' displayed at f1×sin (θ) on display 2L (2R) corresponds to image S2 at parallax direction θ.

Figure 5:
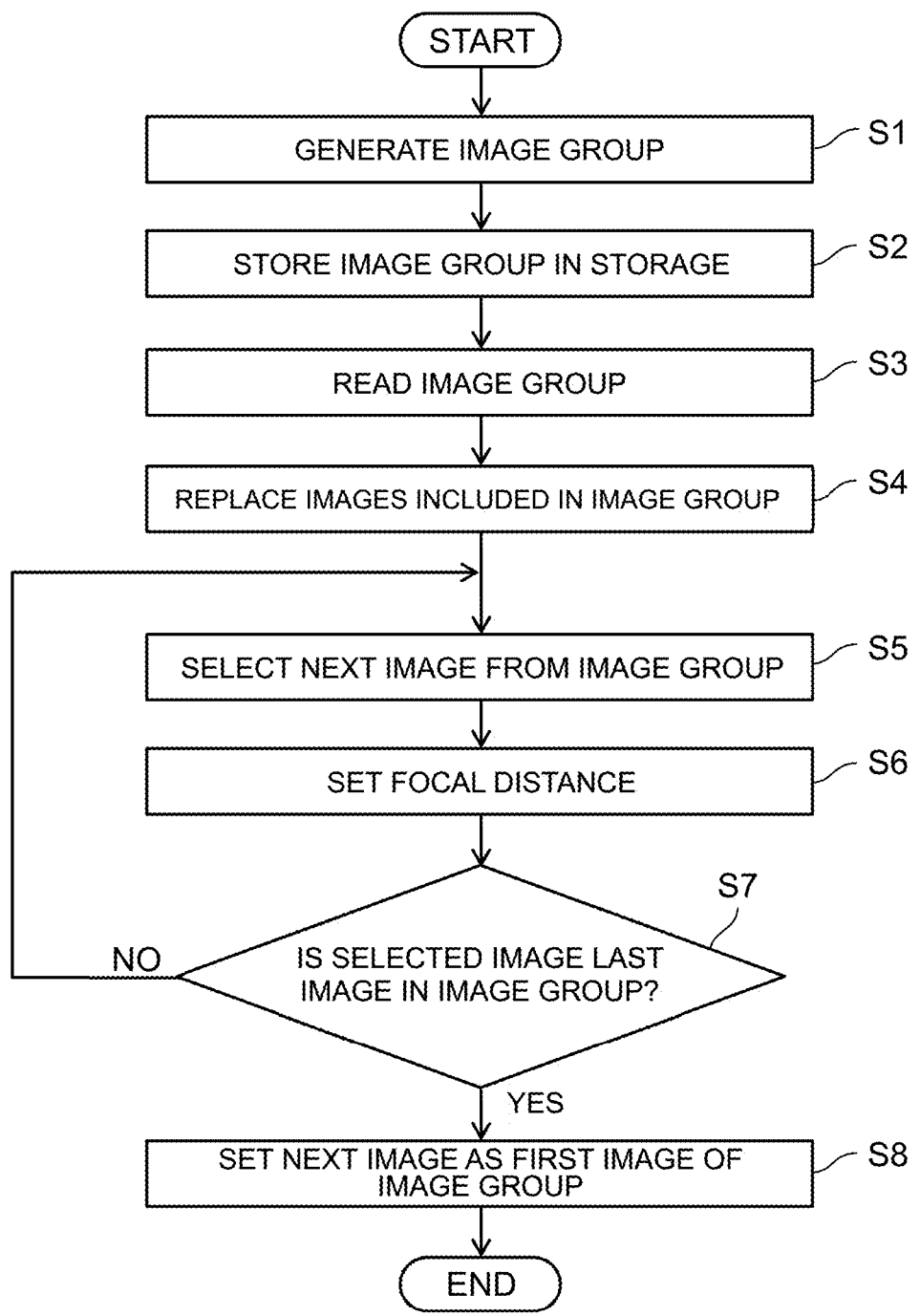
FIG. 5 is a flowchart illustrating processing for displaying an image on a display device according to the first exemplary embodiment.

FIG. 5 is a flowchart illustrating processing for displaying an image on the display device according to the first exemplary embodiment.

To begin with, an image group to be displayed on the display is generated (step S1). Specifically, as described with reference to FIG. 3, the camera (imaging surface 5) generates (captures) a plurality of images (image groups) including objects P1, P2, while changing focal length f of varifocal lens 1L (1R). The image group is then stored in an external storage (step S2).

Controller 3 then reads the image group from the external storage (step S3), and replaces the image group stored in controller 3 with the image group stored therein (step S4). For example, controller 3 compares the images included in the image group, and replaces any image determined to be different.

Controller 3 selects the next image to be displayed on display 2L (2R), from the images included in the image group (step S5), and displays the selected image on display 2L (2R). Specifically, controller 3 selects, as the next image, an image having a shorter (or longer) focal length than the image previously selected from the image group stored in controller 3. In this case, controller 3 selects the next image so as to gradually shorten (or extends) the focal length of the image displayed on display 2L (2R). That is, controller 3 selects the next image so that the image group is sequentially displayed on display 2L (2R) in the order of the focal length. Controller 3 then sets focal length f of varifocal lens 1L (1R) to the focal length used when the selected image is captured (step S6).

Controller 3 determines whether the selected image is the last image to be display among the images included in the image group (step S7). If controller 3 determines that the selected image is not the last image to be displayed among the images included in the image group (No in step S7), controller 3 returns to step S5.

If controller 3 determines that the selected image is the last image to be displayed among the images included in the image group (Yes in step S7), controller 3 sets the next image to be displayed on display 2L (2R) as the first image to be displayed among the images included in the image group (step S8). After step S8, controller 3 goes back to step S3, and repeats the processing in step S3 and thereafter.

With the above configuration, the display device according to the present exemplary embodiment includes: varifocal lens 1L (1R) having variable focal length f; display 2L (2R) disposed facing varifocal lens 1L (1R); and controller 3 configured to control focal length f of varifocal lens 1L and to cause display 2L (2R) to display an image. When distant image 1S is to be displayed on display 2L (2R), controller 3 extends focal length f of varifocal lens 1L (1R); and when nearby image 2S is to be displayed on display 2L (2R), controller 3 shortens focal length f of varifocal lens 1L (1R). Nearby image 2S herein is an image of an object nearer to the user than distant image IS in the virtual space.

With the conventional configuration, a user perceives display 2L (2R) through a lens with a constant focal length, and even if the focal length corresponding to the image displayed on display 2L (2R) changes, the position of display 2L (2R) remains the same. For this reason, in order for the user to perceive the image displayed on display 2L (2R), the user has needed to adjust the focal length of the crystalline lenses in the eyes, so that the user has experienced eye fatigue or awkwardness in the vision.

By contrast, in the present exemplary embodiment, controller 3 extends focal length f of varifocal lens 1L (1R) when distant image 1S is to be displayed on display 2L (2R), and shortens focal length f of varifocal lens 1L (1R) when nearby image 2S is to be displayed on display 2L (2R). In other words, because controller 3 adjusts focal length f of varifocal lens 1L (1R) depending on the focal length corresponding to the image being displayed on display 2L (2R), it is possible to alleviate the eye fatigue and awkwardness in the vision.

In addition, controller 3 causes display 2L (2R) to sequentially display a plurality of images included an image group in the order of the focal length, with each of the images set with a different focal length from those of the others. Controller 3 then sets the focal length of varifocal lens 1L (1R) to the focal length corresponding to the image being displayed on display 2L (2R). As a result, by sequentially displaying a plurality of images included in an image group, with each of the plurality of images having been set with a focal length different from those of the others, the image displayed on display 2L (2R) and the focal length of varifocal lens 1L (1R) are caused to change gradually. In this manner, the burden on the eyes can be alleviated.

Furthermore, a plurality of images to be included in the image group to be displayed on display 2L (2R) are captured through varifocal lens 1L (1R) using a camera (imaging surface 5), while changing focal length f of varifocal lens 1L (1R). In this manner, a plurality of images, each at a different focal length, can be generated (captured).

Second Exemplary Embodiment

Figure 6:
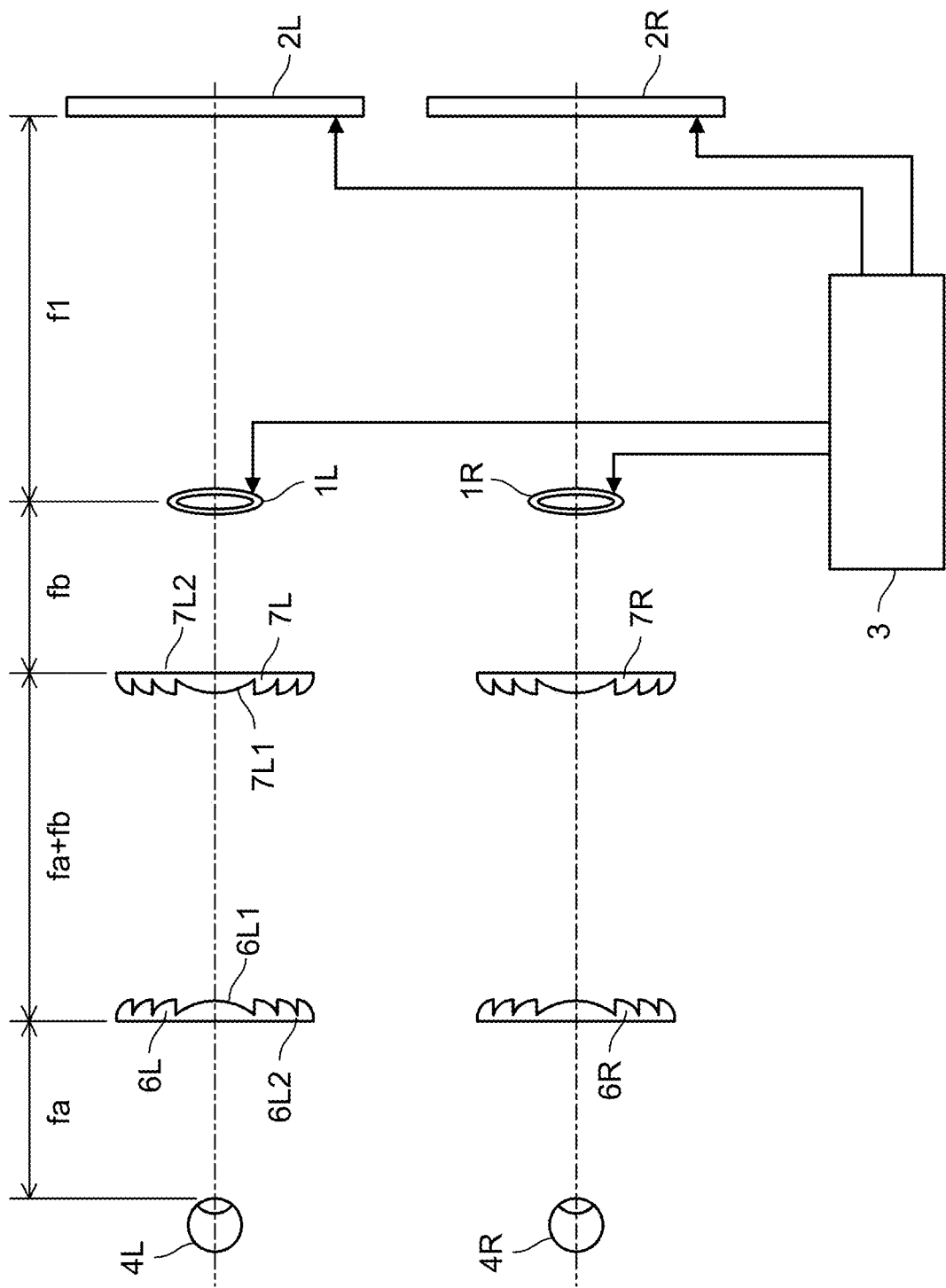
FIG. 6 is a schematic diagram of a display device according to a second exemplary embodiment.

FIG. 6 is a schematic diagram of a display device according to a second exemplary embodiment. In FIG. 6, relay lenses 6L, 7L (6R, 7R) are disposed between left eye 4L (right eye 4R) and varifocal lens 1L (1R), as compared with FIG. 1. Relay lenses 6L, 6R correspond to a first relay lens, and relay lenses 7L, 7R correspond to a second relay lens. Relay lens 6L has incident surface 6L1 and emergent surface 6L2. Relay lens 7L has incident surface 7L1 and emergent surface 7L2.

As illustrated in FIG. 6, relay lens 6L (6R) is disposed in such a manner that the focal plane on the emergent surface side is matched with the position of the pupil of user's left eye 4L (right eye 4R). Relay lens 6L (6R) is also disposed in such a manner that the focal plane on the incident surface side is matched with the focal plane on the incident surface side of relay lens 7L (7R). Relay lens 7L (7R) is disposed in such a manner that the focal plane on the emergent surface side is matched with varifocal lens 1L (1R). The focal plane herein means a plane including the focal point of the lens.

By disposing relay lenses 6L (6R), 7L (7R) in such a manner that the focal planes thereof are matched with each other, an imaging relationship is established between relay lens 6L (6R) and relay lens 7L (7L). That is, the emergent light from the incident surface of relay lens 6L (6R) is condensed at one point on the focal plane on the emergent surface side of relay lens 7L (7R).

Denoting the focal length of relay lens 6L (6R) as fa, and denoting the focal length of relay lens 7L (7R) as fb, fa/fb times the aperture of the pupil of left eye 4L (right eye 4R) corresponds to the effective diameter of varifocal lens 1L (1R). In the first exemplary embodiment, because a predetermined distance is required between left eye 4L (right eye 4R) and varifocal lens 1L (1R), it is necessary to increase the effective diameter of varifocal lens 1L (1R) in accordance with the angle of view, that is, the field of view. By contrast, in the second exemplary embodiment, because relay lenses 6L, 7L (6R, 7R) make the distance between the pupil of left eye 4L (right eye 4R) and varifocal lens 1L (1R) zero, it is possible to keep the effective diameter of varifocal lens 1L (1R) small. Furthermore, because the diameter of the pupil of left eye 4L (right eye 4R) on varifocal lens 1L (1R) is fa/fb times the diameter of the actual pupil, it is possible to make the effective diameter of varifocal lens 1L (1R) even smaller by setting fa<fb. Moreover, when the effective diameter is smaller, varifocal lens 1L (1R) can respond more quickly; therefore, it is possible to suppress flickering of an image being displayed on display 2L (2R).

Figure 7:
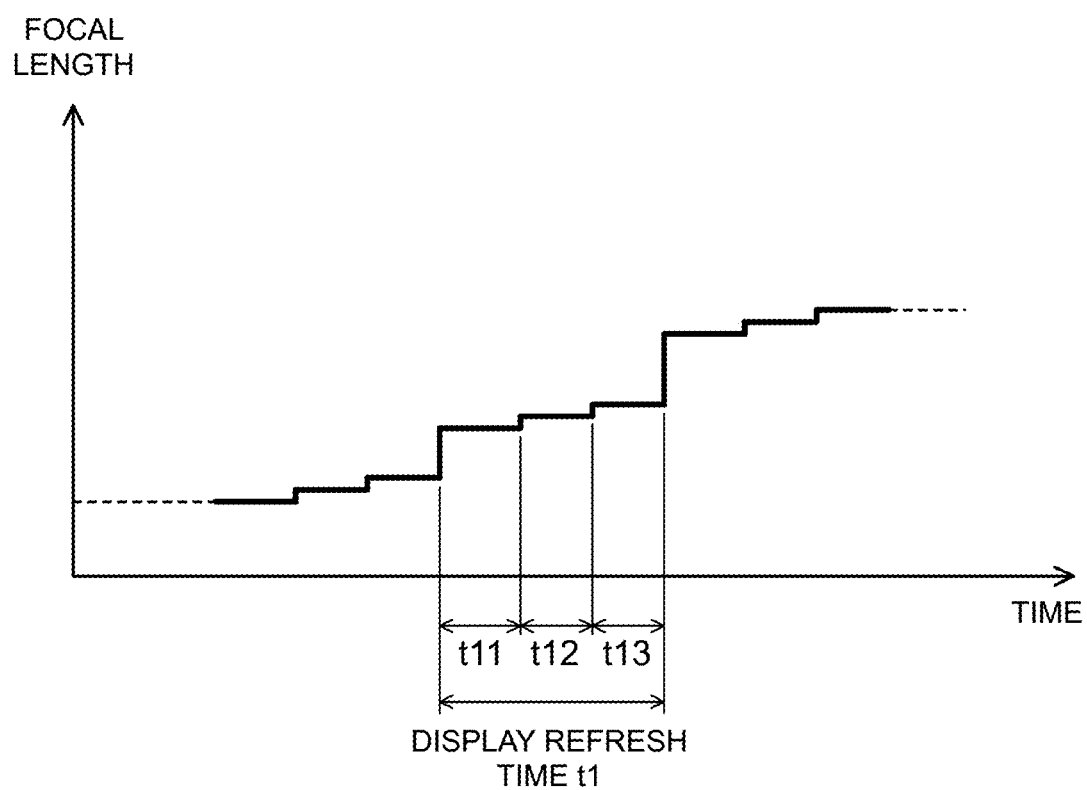
FIG. 7 is a graph illustrating a change in the focal length of a varifocal lens according to a second exemplary embodiment.

An operation of the display device according to the second exemplary embodiment will now be described. In the display device according to the first exemplary embodiment, pixels of three colors of RGB (red, green, and blue) are caused to emit light simultaneously when the image on display 2L (2R) is refreshed. By contrast, in the display device according to the second exemplary embodiment, the image to be displayed on display 2L (2R) is decomposed into three images corresponding to RGB colors, respectively, and the three images are displayed in the order of R, G, and B, on display 2L (2R). At this time, controller 3 changes focal length f of varifocal lens 1L (1R) correspondingly to each of RGB colors, within one image refresh time t1 (see FIG. 7). Specifically, image refresh time t1 includes image refresh time t11 for displaying the decomposed image corresponding to R, image refresh time t12 for displaying the decomposed image corresponding to G, and image refresh time t13 for displaying the decomposed image corresponding to B.

As described above, because relay lenses 6L, 6R, 7L, 7R are Fresnel lenses, while reductions in the thickness and weight are possible, chromatic aberration among the wavelengths of light, that is, variations in the focal lengths among colors tend to be more prominent. While chromatic aberration can be corrected by combining a plurality of lenses, not only the structure becomes complicated, but also the size and the weight are increased, and assembly adjustments become difficult. Therefore, in the second exemplary embodiment, by controlling focal length f of varifocal lens 1L (1R) so as to adjust the offsets in the focal lengths among the colors, the effect of color misalignment in the image caused by chromatic aberration or the like can be suppressed. As for the amount by which the focal length is controlled for each of the RGB colors, measurements for the amount minimizing the color misalignment in the image caused by chromatic aberration may be collected in advance.

With the configuration described above, the display device according to the second exemplary embodiment includes relay lens 6L, 6R and relay lens 7L, 7R; the focal plane on the emergent surface side of relay lens 6L, 6R is matched with the position of the pupil of left eye 4L (right eye 4R) of the user; the focal plane on the incident surface side of relay lens 7L, 7R is matched with the focal plane on the incident surface side of the first relay lens; and the varifocal lens is disposed on the focal plane on the emergent surface side of relay lens 7L, 7R. With this, the effective diameter of varifocal lens 1L (1R) can be kept small, because relay lens 6L, 7L (6R, 7R) makes the distance between the pupil of left eye 4L (right eye 4R) and varifocal lens 1L (1R) zero. Furthermore, because the pupil diameter of left eye 4L (right eye 4R) will be fa/fb time on varifocal lens 1L (1R) (where fa is the focal length of relay lens 6L (6R) and fb is the focal length of relay lens 7L (7R)), by setting fa <fb, the effective diameter of varifocal lens 1L (1R) can be made even smaller.

Furthermore, relay lenses 6L, 6R, 7L, 7R are Fresnel lenses. Therefore, it is possible to reduce the size of the display device in the optical axis direction.

Furthermore, controller 3 decomposes the image to be displayed on display 2L (2R) into those corresponding to RGB colors, respectively, and displays the decomposed images on display 2L (2R), while setting focal length f of varifocal lens 1L (1R) to the focal length suitable for the image being displayed on display 2L (2R). As a result, it is possible to correct the offsets in the focal lengths for the respective colors in the image, the offsets being resultant of the use of relay lenses 6L, 6R, 7L, 7R that are Fresnel lenses.

Relay lenses 6L, 6R, 7L, 7R have been described above as Fresnel lenses; however, it is also possible to use an achromatic lens or a plurality of lenses. When an achromatic lens or a plurality of lenses are used to reduce the chromatic aberration, it is possible to separate the image to be displayed on display 2L (2R) into those of RGB colors, respectively, or omit the control of focal length f of varifocal lens 1L (1R).

The order in which the color-separated images are displayed may not be in the order of R, G, and B, and such images may be displayed in any order.

Third Exemplary Embodiment

Figure 8:
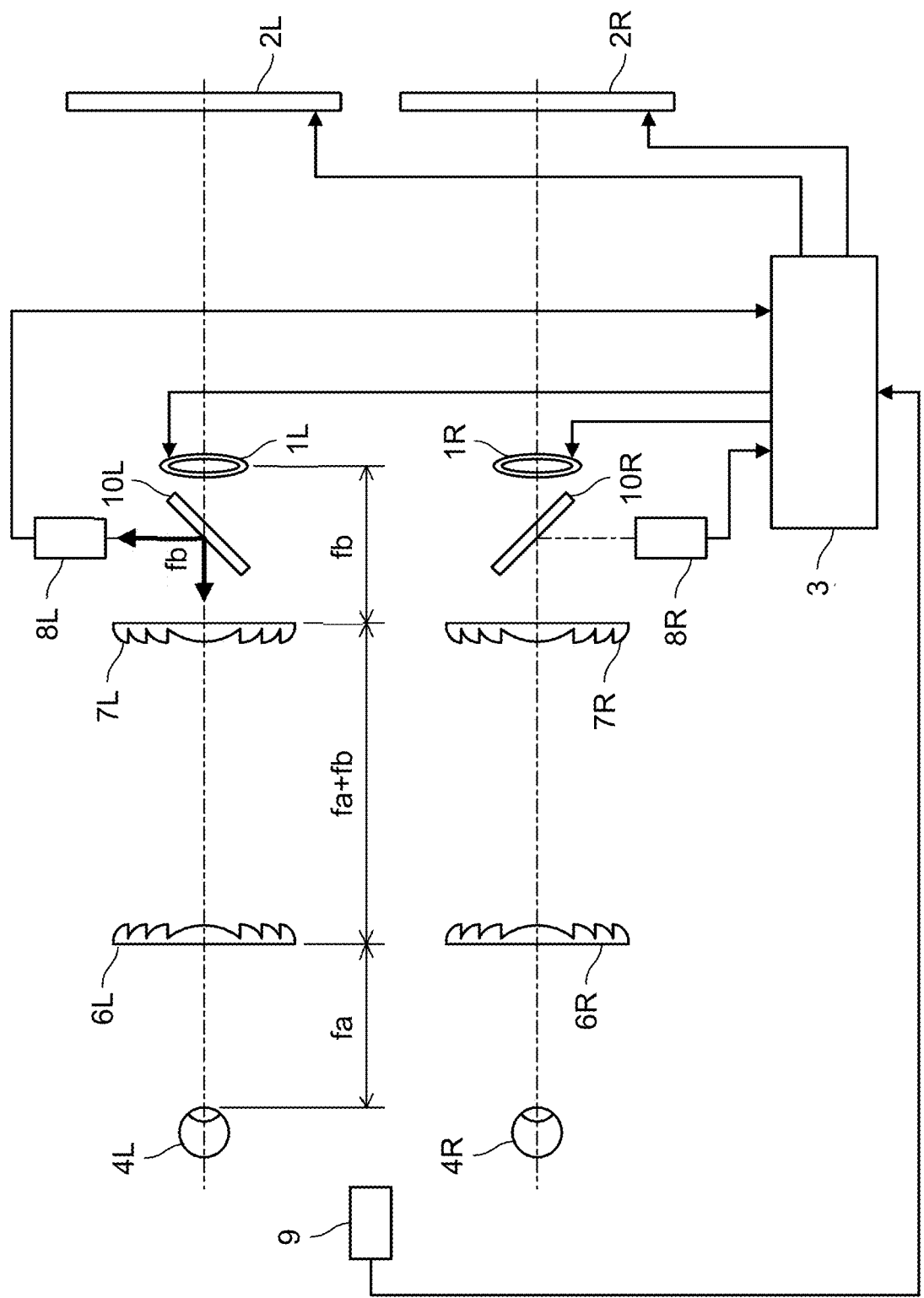
FIG. 8 is a schematic diagram of a display device according to a third exemplary embodiment.

FIG. 8 is a schematic diagram of a display device according to a third exemplary embodiment. As illustrated in FIG. 8, the display device according to the third exemplary embodiment includes camera 8L (8R) and sensor 9. Camera 8L (8R) corresponds to a first sensor, and sensor 9 corresponds to a second sensor.

An example of camera 8L (8R) is a near infrared camera. An image of left eye 4L (right eye 4R) is captured by camera 8L (8R) via half mirror 10L (10R) that is disposed between varifocal lens 1L (1R) and relay lens 7L (7R). Camera 8L (8R) is disposed on the focal plane on the emergent surface side (focal length fb) of relay lens 7L (7R), via half mirror 10L (10R). Half mirror 10L (10R) is a near infrared reflecting mirror, for example, and transmits visible light and reflects only the near infrared light.

An example of sensor 9 is an acceleration sensor. Sensor 9 is mounted on the head of the user, and detects the direction in which the head of the user faces (head direction).

Relay lenses 6L (6R), 7L (7R) are disposed in a manner having their respective focal planes are matched with each other, as described above. Furthermore, relay lens 6L (6R) is disposed in such a manner that the focal plane on the emergent surface side is matched with the position of the pupil of user's left eye 4L (right eye 4R). Furthermore, relay lens 7L (7R) is disposed in such a manner that the focal plane on the emergent surface side is matched with the imaging plane of camera 8L (8R). As a result, because camera 8L (8R) and left eye 4L (right eye 4R) are in an imaging relationship, an image of left eye 4L (right eye 4R) can be captured by camera 8L (8R).

Figure 9:
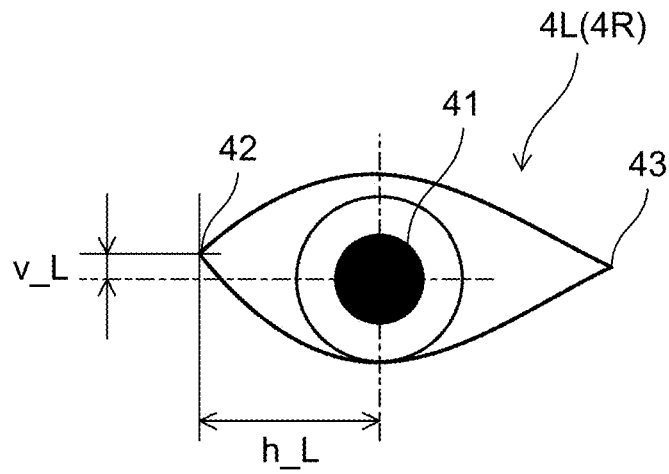
FIG. 9 is an example of an image captured by a camera according to the third exemplary embodiment.

FIG. 9 is an example of the image formed on the camera according to the third exemplary embodiment. As illustrated in FIG. 9, the image formed on camera 8L (8R) includes an image of left eye 4L (or right eye 4R). Upon receiving the image from camera 8L (8R), controller 3 detects pupil 41 and inner corner 42 and outer corner 43 of left eye 4L (or right eye 4R), for example, from the image. Controller 3 then calculates the position of pupil 41 (position v_L in the vertical direction and position h_L in the horizontal direction) with respect to inner corner 42 of the eye as a reference. Controller 3 then calculates the direction of user's eye gaze, from the relationship between a reference position of pupil 41 and the calculated position of pupil 41. The reference position of pupil 41 herein is the position of pupil 41 of the user gazing at a predetermined mark being displayed at an appropriate position on display 2L (2R).

Figure 10:
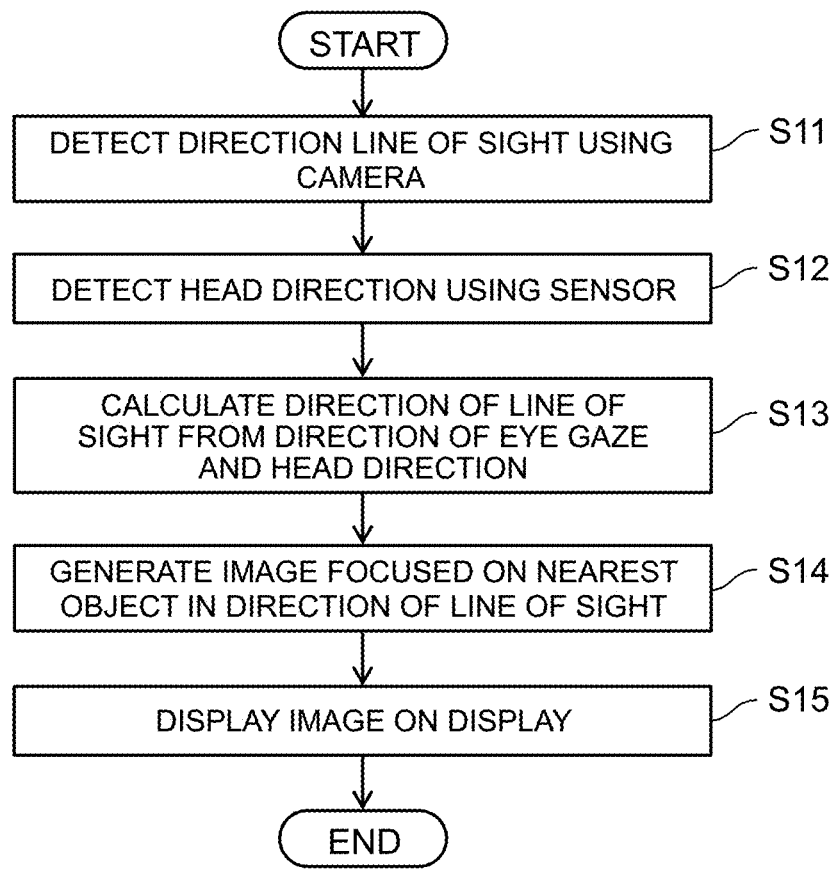
FIG. 10 is a flowchart illustrating processing for displaying an image on the display device according to the third exemplary embodiment.

FIG. 10 is a flowchart illustrating processing for displaying an image on the display device according to the third exemplary embodiment.

To begin with, an image of left eye 4L (right eye 4R) is captured by camera 8L (8R). Controller 3 then calculates the direction of user's eye gaze from the image of the pupil of left eye 4L (right eye 4R) included in the image (step S11). Controller 3 then detects the direction of the user's head, on the basis of the output from sensor 9 (step S12). Controller 3 calculates the direction of the line of sight on the basis of the directions of the user's eye gaze and head (step S13).

Controller 3 then calculates distance Z to the object nearest to the user in the virtual space along the calculated direction of the line of sight, and generates an image with the focus on the object (step S14). At this time, controller 3 generates (captures) the image by following the image generation method described with reference to FIG. 3.

Controller 3 then display the image generated in step S3 on display 2L (2R), and sets focal length f of varifocal lens 1L (1R) to distance Z (step S15).

With the above configuration, the display device according to the third exemplary embodiment includes cameras 8L, 8R (first sensor) configured to detect the position of the pupil of the user, and sensor 9 (second sensor) configured to detect the direction of the head of the user. Controller 3 calculates the direction of line of sight of the user on the basis of the detection results of camera 8L (8R) and sensor 9, causes display 2L (2R) to display an image having been generated in such a manner the focus is on the nearest object in the virtual space along the direction of line of sight, and sets focal length f of varifocal lens 1L (IR) to the focal length for the image. As a result, focal length f of varifocal lens 1L (1R) and the image on display 2L (2R) need to be changed only when the user changes the direction of line of sight. Therefore, it is possible to largely suppress the flickering of the image displayed on display 2L (2R).

Other Exemplary Embodiments

The above exemplary embodiments have been described as examples of the technology disclosed in the present application. However, the technique according to the present disclosure is not limited to these exemplary embodiments, and is applicable to exemplary embodiments in which changes, replacements, additions, omissions, or the like are made as appropriate.

Display 2L (2R) has been described as having LEDs as pixels, but is not limited thereto, and may have organic EL elements as its pixels.

Furthermore, the colors of the pixels included in display 2L (2R) are not limited to three colors of RGB, and may be two or less colors, or four or more colors.

Furthermore, display 2L (2R) may also display images as the images are calculated, when controller 3 has high calculation capability, or may also display images having been generated in advance.

Furthermore, in FIG. 4 and the like, the number of objects the images of which are captured by the camera is not limited to two, and there is no limitation as to how the objects are arranged, either.

Furthermore, in the process of generating the image, as illustrated in FIG. 4 and the like, the camera may capture a real image, or generate an image on the basis of the 3D data in the virtual space.

In addition, the image group generated and stored in steps S1 and S2 may be prepared in advance before the images are displayed; or it is also possible to generate the images in parallel, as the images are displayed.

The number of images included in the image group is not limited to thirty either, and the number may be any number as long as the image group includes at least two or more images having focal lengths different from one another. When a larger number of images is included in the image group, the images are displayed at better resolution in the depth direction. It is provided, however, that images being displayed on display 2L (2R) need to be refreshed at a higher speed, accordingly.

It is also possible to dispose a half mirror between left eye 4L (right eye 4R) and varifocal lens 1L (1R), so that a real image is perceived in a manner overlapping with the virtual depth image from the two-dimensional display.

Furthermore, the display device according to the first to third exemplary embodiments is also applicable as a wearable device such as a head-mounted display, a head-up display, or a wearable camera including the elements of the display device according to the first to third exemplary embodiments.

INDUSTRIAL APPLICABILITY

The display device according to the present disclosure can provide users with a stereoscopic view of objects in a virtual space, and therefore, is applicable to devices such as a head-up display and a wearable device.

REFERENCE MARKS IN THE DRAWINGS 1L, 1R: varifocal lens
2L, 2R: display
3: controller
4L, 4R: user's right eye and left eye
6L, 6R: relay lens (first relay lens)
7L, 7R: relay lens (second relay lens)
8L, 8R: camera (first sensor)
9: sensor (second sensor)

The invention claimed is:

1. A display device comprising:
a varifocal lens having a variable focal length;
a first relay lens having an incident surface and an emergent surface;
a second relay lens having an incident surface and an emergent surface;
a display disposed facing the varifocal lens; and
a controller configured to cause the display to display an image, while controlling a focal length of the varifocal lens,
wherein the controller extends the focal length of the varifocal lens when a distant image is to be displayed in the image, and shortens the focal length of the varifocal lens when a nearby image is to be displayed in the image,
a focal plane on an emergent surface side of the first relay lens is matched with a position of a pupil of a user,
a focal plane on an incident surface side of the second relay lens is matched with a focal plane on an incident surface side of the first relay lens, and
the varifocal lens is disposed on a focal plane on an emergent surface side of the second relay lens.

2. The display device according to claim 1, wherein the controller is configured to display a plurality of images included in an image group in sequence, the plurality of images being set with a plurality of respective focal lengths that are different from one another, and being displayed in order of the focal length, and is configured to set the focal length of the varifocal lens to the focal length corresponding to the image being displayed on the display.

3. The display device according to claim 2, wherein the image group is captured through the varifocal lens, while changing the focal length of the varifocal lens.

4. The display device according to claim 1, wherein each of the first relay lens and the second relay lens is a Fresnel lens.

5. The display device according to claim 4, wherein the controller is configured to decompose the image into three images corresponding to RGB colors, respectively, to display the three images on the display, and to set a focal length of the varifocal lens to a focal length of each of the three images being displayed on the display.

6. The display device according to claim 1, further comprising:
a first sensor configured to detect a position of a pupil of a user; and
a second sensor configured to detect an orientation of a head of the user,
wherein the controller is configured to calculate a direction of line of sight of the user based on a detection result of the first sensor and the second sensor, to display an image on the display having been generated so as to have a focus on an object nearest to the user in the direction of line of sight in a virtual space, and to set a focal length of the varifocal lens to a focal length corresponding to the image.

7. A displaying method using a display device including a varifocal lens having a variable focal length, a first relay lens having an incident surface and an emergent surface, a second relay lens having an incident surface and an emergent surface, a display disposed facing the varifocal lens, and a controller configured to control a focal length of the varifocal lens and to display an image on the display, wherein a focal plane on an emergent surface side of the first relay lens is matched with a position of a pupil of a user, a focal plane on an incident surface side of the second relay lens is matched with a focal plane on an incident surface side of the first relay lens, and the varifocal lens is disposed on a focal plane on an emergent surface side of the second relay lens, the displaying method comprising:
a first step of generating an image group including a plurality of images set with a plurality of respective focal lengths that are different from one another;
a second step of causing the display to sequentially display the image group in order of the focal lengths corresponding to the images, respectively, and setting the focal length of the varifocal lens to the focal length corresponding to an image being displayed on the display; and
a third step of regenerating the image group and performing the second step again, subsequently to the second step.

8. A display method using a display device including a varifocal lens having a variable focal length, a first relay lens having an incident surface and an emergent surface, a second relay lens having an incident surface and an emergent surface, a display disposed facing the varifocal lens, and a controller configured to control a focal length of the varifocal lens and to cause the display to display an image, wherein a focal plane on an emergent surface side of the first relay lens is matched with a position of a pupil of a user, a focal plane on an incident surface side of the second relay lens is matched with a focal plane on an incident surface side of the first relay lens, and the varifocal lens is disposed on a focal plane on an emergent surface side of the second relay lens, the display method comprising:
- a step of detecting a direction of line of sight of a user based on the position of the pupil of the user and an orientation of a head of the user;
- a step of generating an image having a focus on an object nearest to the user along the direction of line of sight in a virtual space; and
- a step of displaying the image on the display, and setting a focal length of the varifocal lens to a focal length corresponding to the image.

\* \* \* \* \*